United States Patent
Dalsgaard et al.

(10) Patent No.: US 8,000,707 B2
(45) Date of Patent: Aug. 16, 2011

(54) APPARATUS, METHOD AND COMPUTER PROGRAM PRODUCT PROVIDING 3.9G MOBILE-ASSISTED CELL CHANGE

(75) Inventors: Lars Dalsgaard, Oulu (FI); Jarkko T. Koskela, Oulu (FI)

(73) Assignee: Nokia Corporation, Espoo (FI)

( * ) Notice: Subject to any disclaimer, the term of this patent is extended or adjusted under 35 U.S.C. 154(b) by 937 days.

(21) Appl. No.: 11/728,390

(22) Filed: Mar. 26, 2007

(65) Prior Publication Data
US 2007/0224992 A1    Sep. 27, 2007

Related U.S. Application Data

(60) Provisional application No. 60/786,823, filed on Mar. 27, 2006.

(51) Int. Cl.
*H04W 36/00* (2009.01)

(52) U.S. Cl. ............... 455/436; 370/329; 370/236.1

(58) Field of Classification Search ............ 455/436
See application file for complete search history.

(56) References Cited

U.S. PATENT DOCUMENTS

| | | | |
|---|---|---|---|
| 6,647,262 B1 * | 11/2003 | Demetrescu et al. | 455/436 |
| 2002/0137522 A1 * | 9/2002 | Landais et al. | 455/455 |
| 2003/0095552 A1 * | 5/2003 | Bernhard et al. | 370/395.21 |
| 2003/0125028 A1 * | 7/2003 | Reynolds | 455/437 |
| 2003/0139186 A1 * | 7/2003 | Igarashi et al. | 455/438 |
| 2004/0116110 A1 * | 6/2004 | Amerga et al. | 455/422.1 |
| 2007/0149206 A1 * | 6/2007 | Wang et al. | 455/450 |
| 2008/0039092 A1 * | 2/2008 | Kitazoe | 455/436 |

FOREIGN PATENT DOCUMENTS

| | | |
|---|---|---|
| WO | WO-01/17305 A1 | 3/2001 |
| WO | WO-01/17306 A1 | 3/2001 |
| WO | WO-03/105516 A1 | 12/2003 |
| WO | WO-2005/029785 A1 | 3/2005 |

* cited by examiner

*Primary Examiner* — Rafael Pérez-Gutiérrez
*Assistant Examiner* — Marcos Batista
(74) *Attorney, Agent, or Firm* — Harrington & Smith (57) ABSTRACT

Disclosed herein are apparatus, method and computer program product providing 3.9G mobile-assisted cell change. During an active state of user equipment, it is determined whether at least one trigger condition exists. If at least one trigger condition is determined to be present, the user equipment performs an autonomous cell change. Alternatively, if at least one trigger condition is determined not to be present, the user equipment performs a cell change under network control (non-autonomous).

29 Claims, 11 Drawing Sheets

APPARATUS, METHOD AND COMPUTER PROGRAM PRODUCT PROVIDING 3.9G MOBILE-ASSISTED CELL CHANGE

CROSS REFERENCE TO A RELATED UNITED STATES PATENT APPLICATION

This application hereby claims priority under 35 U.S.C. §119(e) from copending provisional U.S. Patent Application No. 60/786,823 entitled "APPARATUS, METHOD AND COMPUTER PROGRAM PRODUCT PROVIDING 3.9G MOBILE-ASSISTED CELL CHANGE" filed on Mar. 27, 2006 by Lars Dalsgaard and Jarkko Koskela. This preceding provisional application is hereby incorporated by reference in its entirety.

TECHNICAL FIELD

The exemplary and non-limiting embodiments of this invention relate generally to wireless communications systems, methods, computer program products and devices and, more specifically, relate to hand over or hand off (HO) procedures executed when a user equipment (UE) changes cells.

BACKGROUND

The following abbreviations are herewith defined:
3GPP Third Generation Partnership Project
AT Allocation Table
DL Downlink (Node B to UE)
DRX Discontinuous Reception
GSM Global System for Mobile Communication
IMS Instant Messaging Service
LTE Long Term Evolution
Node B Base Station
RNC Radio Network Control
RRC Radio Resource Control
SIB System Information Block
UE User Equipment
UL Uplink (UE to Node B)
UMTS Universal Mobile Telecommunications System
UTRAN UMTS Terrestrial Radio Access Network
E-UTRAN Evolved UTRAN In 3.9G (E-UTRAN) it has been agreed that the mobility principle for a UE in the Active state will be network controlled handover. This means that when the UE is in the Active state the UE is expected to provide the network with measurement reports for providing the network with information to assist it in making a HO decision. UE performed measurements, which form the basis of the measurement reports send by the UE to the network, are normally performed when the UE is active for transmission and/or reception of data. A current general view in 3.9G is that data transmission and/or reception is linked to the DRX scheme of the UE. The DRX scheme basically pertains to when the UE wakes up from an inactive period (sleep) in order to receive information as to whether any UL or DL resources have been assigned for the UE. In 3.9G the resource assignment is proposed to be done through ATs.

It has been realized that combining Active state mobility through network controlled HO may not be fully compatible with another 3.9G requirement concerning optimized power saving possibilities for those UEs in the Active state. Enhanced power saving possibilities may have the side effect of introducing long delays in the measurements performed by the UE, and thus in the measurements reports sent to the network from the UE. This delay from the UE side in providing the measurement reports to the network can be expected to introduce an overall delay in the HO decision made by the network, thereby delaying the overall HO procedure and adversely affecting the mobility of the UE. In a worst case the delay in making a HO decision in the network may cause increased inter-cell interference and possibly a loss of service.

The GSM system uses HO when in the dedicated mode (circuit switched mode), otherwise cell reselection is performed as either network assisted or stand-alone. The UTRAN system supports both HO and cell reselection as well.

In a 3GPP 3.9G study item the problem stated above been has been acknowledged, and various proposals have been made.

A first proposal would keep the UE in the Active state only for very short periods of time (10-20 Seconds) and let the transition to the idle state be done without signaling between the network and the UE (e.g. timer based). However, a problem with this proposal is the handling of error cases when the UE and the network are unsynchronized concerning the UE state (Active or Idle), which has the potential to introduce unacceptable behavior.

Another proposal also would keep the UE in the Active state only for very short periods of time (10-20 Seconds), but would then let the transition be accomplished using, e.g., RRC signaling between network and UE. A potential problem with this proposal is that a UE which performs frequent IP transfers (e.g., e-mail, TCP/IP keep alive, IMS keep alive) may cause excessive signaling to be performed due to the frequent RRC state transfers.

Another proposal introduces pull-mode/re-active HO in the Active state (which resembles cell reselection).

Prior to this invention, no completely satisfactory solution has been proposed to the problems discussed above.

SUMMARY OF THE INVENTION

The foregoing and other problems are overcome, and other advantages are realized, in accordance with the following embodiments of the invention.

A first embodiment of the invention is a method. In the method it is detected that user equipment is in an active state. Then, it is determined whether at least one trigger condition is satisfied. If the at least one trigger condition is satisfied, the user equipment performs autonomous cell change to a neighboring cell. If the at least one trigger condition is not satisfied, the user equipment performs cell reselection under network control.

A second embodiment of the invention is user equipment operative in a wireless communications network comprising a transceiver configured to bi-directionally communicate; at least one memory configured to store a computer program configured to control the user equipment when executed; and digital processing apparatus coupled to the transceiver and to the memory. When the computer program is executed by the digital processing apparatus the user equipment is configured to receive an indication whether at least one trigger condition allowing autonomous cell change to a neighbor cell is satisfied; to perform autonomous cell autonomous cell change to the neighbor cell if the at least one trigger condition is satisfied; and to perform cell change under network control if the at least one trigger condition is not satisfied.

A third embodiment of the invention is user equipment operative in a wireless communication network. The user equipment comprises transceiver means for bidirectionally communicating with the wireless communications network;

memory means for storing program means, the program means for controlling the user equipment when executed; and digital processing means coupled to the transceiver means and the memory means, the digital processing means for executing the program means. When the program means is executed by the digital processing means the user equipment is configured to receive a message from the wireless communication network allowing the user equipment to perform an autonomous cell change from a serving cell to a neighbor cell; and to effect the autonomous cell change from the serving cell to the neighbor cell.

A fourth embodiment of the invention is a computer program product comprising a computer readable memory medium, the computer readable memory medium storing a computer program, the computer program configured to be executed by digital processing apparatus of a device operative in a wireless communications network. When executed, the computer program is configured to determine whether at least one trigger condition is satisfied for user equipment operative in the wireless communications network, wherein when the trigger condition is satisfied the user equipment is permitted to perform an autonomous cell change from a serving cell to a neighbor cell; and to allow the user equipment to perform the autonomous cell change when the trigger condition is satisfied.

A fifth embodiment of the invention is a network access node operative in a wireless communications network, the network access node comprising: a transceiver configured to bidirectionally communicate with user equipment accessible in the wireless communications network; at least one memory configured to store a computer program configured to control the user equipment when executed; and digital processing apparatus coupled to the transceiver and to the memory, the digital processing apparatus configured to execute the computer program. When the computer program is executed by the digital processing apparatus the network access node is configured to determine whether at least one trigger condition is satisfied for a user equipment operative in the wireless communications network; and to communicate to the user equipment that it is authorized to perform autonomous cell change if the at least one trigger condition is satisfied.

A sixth embodiment of the invention is an integrated circuit for use in a device operative in a wireless communications network, the integrated circuit configured to detect whether a particular user equipment is in an active mode; to determine whether at least one trigger condition is satisfied; if the at least one trigger condition is satisfied, to cause the user equipment to perform a cell change to a neighbor cell; and if the at least one trigger condition is not satisfied, to cause the use equipment to perform cell change to a neighbor cell under network control.

BRIEF DESCRIPTION OF THE DRAWINGS

The foregoing and other aspects of these teachings are made more evident in the following Detailed Description of the Invention, when read in conjunction with the attached Drawing Figures, wherein.

DETAILED DESCRIPTION OF THE INVENTION

By way of introduction, the exemplary embodiments of this invention relate to mobility behavior and definitions in 3.9G (also known as LTE or as E-UTRAN). Of particular interest herein is 3.9G UE Active state mobility, as well as Active state mobility rules and triggers for Active state mobility. Although particularly well suited for use in and with 3.9G network Active state mobility environments, the exemplary embodiments of this invention may also find utility in other types of mobile communication systems.

The exemplary embodiments of this invention pertain at least in part to the above mentioned pull-mode/re-active HO in the Active state proposal, and provide an intelligent method of controlling UE reselection using this type of active state mobility handling.

Figure 1:
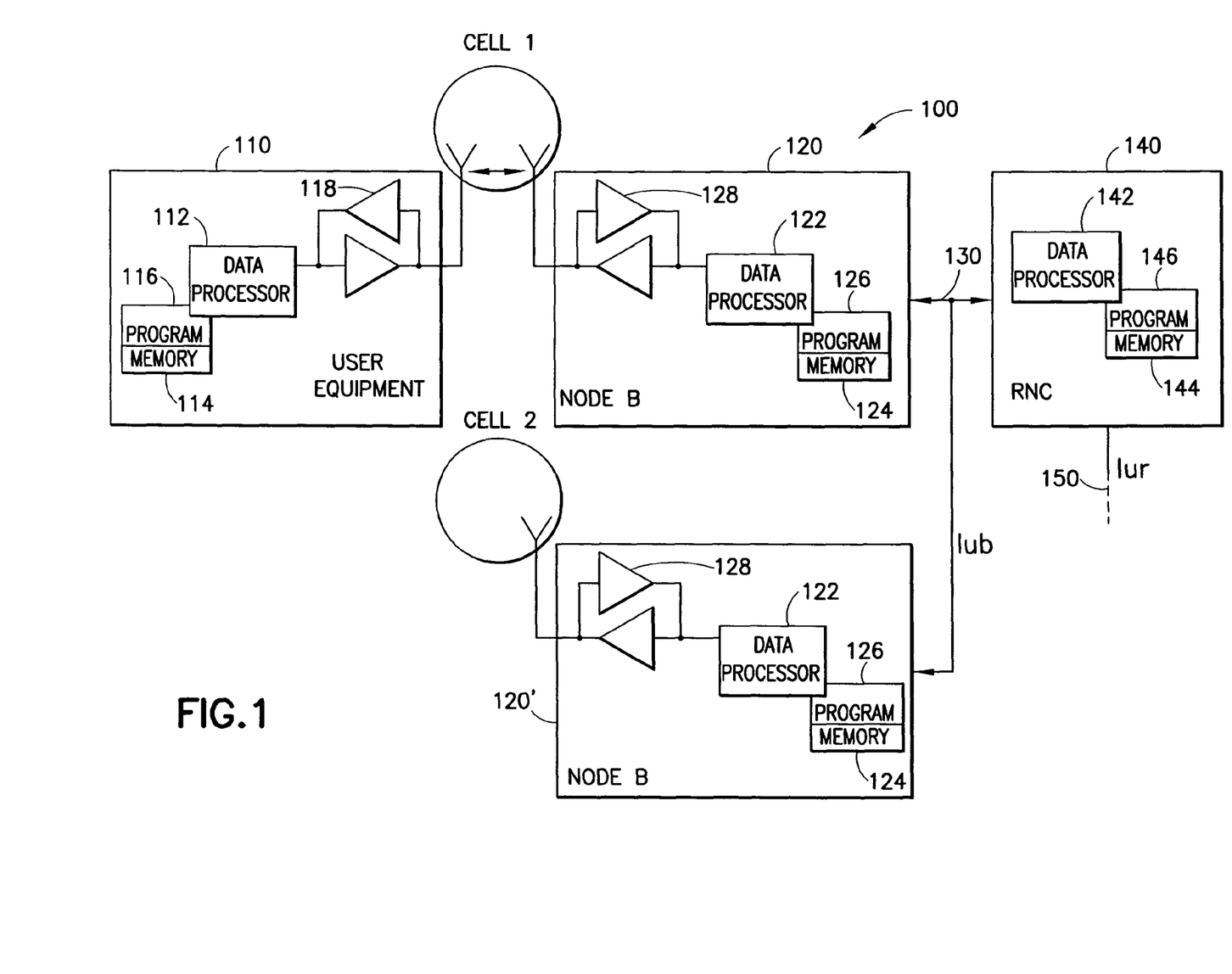
FIG. 1 is a block diagram depicting a wireless communications network in which exemplary embodiments of the invention may be practiced.

Reference is made first to FIG. 1 for illustrating a simplified block diagram of various electronic devices that are suitable for use in practicing the exemplary embodiments of this invention. In FIG. 1 a wireless network 100 is adapted for communication with a UE 110 via a Node B (base station) 120. The network 100 may include a RNC 140, or other radio controller function, which may be referred to as a serving RNC (SRNC). The UE 110 includes a data processor (DP) 112, a memory (MEM) 114 that stores a program (PROG) 116, and a suitable radio frequency (RF) transceiver 118 for bidirectional wireless communications with the Node B 120, which also includes a DP 122, a MEM 124 that stores a PROG 126, and a suitable RF transceiver 128. The Node B 120 is coupled via a data path 130 (Iub) to the RNC 140 that also includes a DP 142 and a MEM 144 storing an associated PROG 146. The RNC 140 may be coupled to another RNC (not shown) by another data path 150 (Iur). At least one of the PROGs 116, 126 and 146 is assumed to include program instructions that, when executed by the associated DP, enable the electronic device to operate in accordance with the exemplary embodiments of this invention, as will be discussed below in greater detail.

Shown in FIG. 1 is also a second Node B 120', it being assumed that the first Node B establishes a first cell (Cell 1) and the second Node B establishes a second cell (Cell 2), and that the UE 110 is capable of a HO from one cell to another. In FIG. 1 the Cell 1 may be assumed to be a currently serving cell, while Cell 2 may be a neighbor or target cell to which HO may occur. Note that the Node Bs could be coupled to the same RNC 140 (as shown), or to different RNCs 140. Note that while shown spatially separated, Cell 1 and Cell 2 will typically be adjacent and/or overlapping, and other cells will typically be present as well.

The exemplary embodiments of this invention may be implemented by computer software executable by the DP 112 of the UE 110 and the other DPs, such as in cooperation with a DP in the network, or by hardware, or by a combination of software and/or firmware and hardware.

In general, the various embodiments of the UE 110 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 114, 124 and 144 may be of any type suitable to the local technical environment and may be implemented using any suitable data storage technology, such as semiconductor-based memory devices, magnetic memory devices and systems, optical memory devices and systems, fixed memory and removable memory. The DPs 112, 122 and 142 may be of any type suitable to the local technical environment, and may include one or more of general purpose computers, special purpose computers, microprocessors, digital signal processors (DSPs) and processors based on a multi-core processor architecture, as non-limiting examples.

Having thus introduced one suitable but non-limiting technical context for the practice of the exemplary embodiments of this invention, the exemplary embodiments will now be described with greater specificity.

The exemplary embodiments of this invention enable permission to be granted for the UE 110 to perform an autonomous cell change in the Active state if certain conditions are fulfilled.

As was mentioned above, the current understanding in 3GPP concerning Active state mobility is that in the Active state the primary mobility option is defined by network controlled, mobile assisted HO. However, in order to assure support for good power saving possibilities in the UE Active state, the exemplary embodiments of this invention provide that an autonomous cell change may be performed (or permitted) if conditions (set by network or by a predefined specification) are fulfilled.

As described earlier the measurements and mobility capabilities for a 3.9G UE 110 depend on the DRX cycle of the UE 110. If an optimum power saving is to be achieved it would not be efficient to require the UE 110 to wake up from sleep between the scheduled DRX cycles just to perform a mobility measurement. However, the currently proposed 3.9G Active mobility concept may unfortunately require this to occur due to the fact that only network controlled HO is supported. The exemplary embodiments of this invention remove the need for interrupting UE 110 inactivity (sleep) periods due to a need to perform mobility measurements.

The use of the exemplary embodiments of this invention enhances the currently proposed 3.9G Active state HO based mobility to include a UE 110 executed autonomous cell change in Active state if one or more network or specification-defined conditions are fulfilled.

The exemplary embodiments of this invention can be supported by specification in several different ways. Non-limiting examples of conditions of which one or more should or could be fulfilled for triggering UE 110 based autonomous cell change in the Active state include (in a non-prioritized order) the following.

Figure 3:
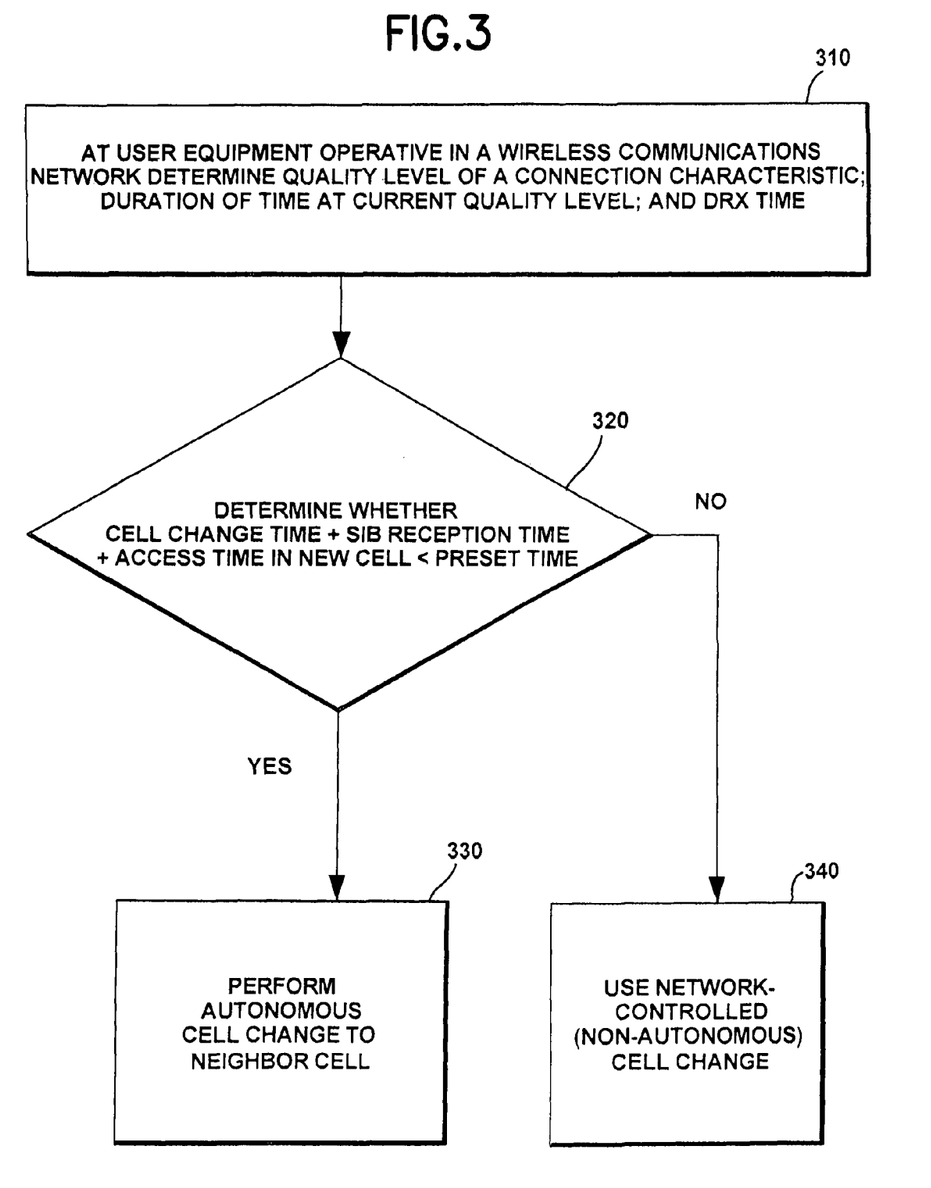
FIG. 3 is a flow chart depicting the decision process for allowing autonomous cell change when the DRX time is greater than a predetermined period, all in accordance with the invention.

A. A first condition is if the DRX period is longer than a specified time. This time limit may be set by the network or it may be determined by other means. One example may be if the next scheduled DRX is further in the future than the UE 110 would normally require to autonomously change cells and initiate cell update/association/registration (in the new/target cell). Reference with regard to this first condition can be made to FIGS. 2-3. In this situation, after performing neighbour cell measurements the UE 110 checks cell change condition, such as Quality level, Time period and/or DRX time as shown at step 310 in FIG. 3. In a next step at 320, a consideration is made of:

(Cell change time+SIB reception time+Access time in new cell)<defined time.

If this expression evaluates as true, the UE 110 autonomously changes cells at step 330, otherwise the UE 110 does not autonomously change cells as shown at step 340.

Figure 6:
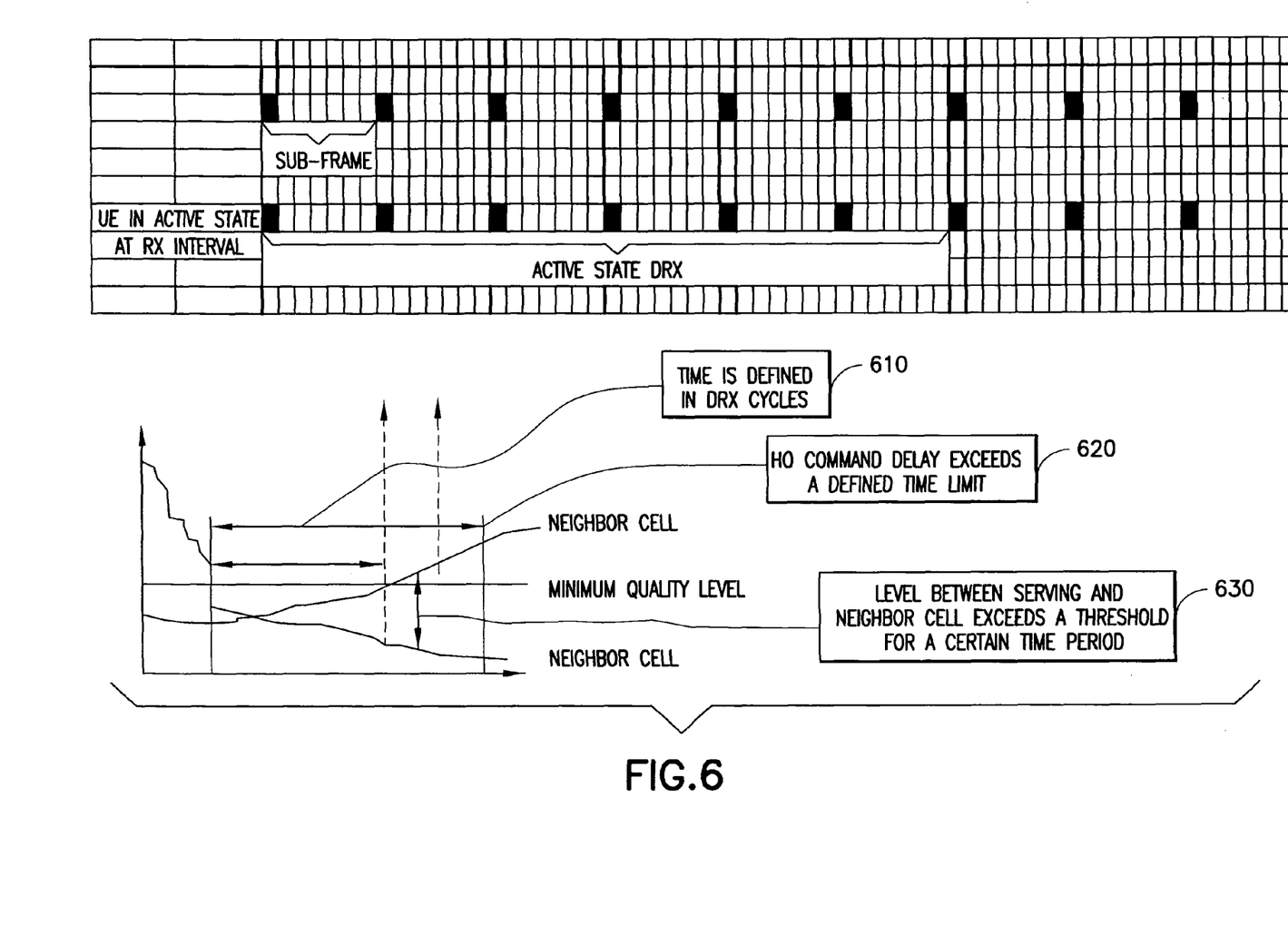
FIG. 6 is another chart depicting trigger situations for allowing autonomous cell selection, all in accordance with the invention.

B. A second condition is if the quality level of the serving cell decreases below a certain pre-defined level (e.g., camping criteria is no longer fulfilled) for some specified length of time. Reference with regard to this condition 630 can be made to FIG. 6.

C. Another condition relates to a basic power or quality level offset between the serving cell and a neighbor cell (for some specified length of time). The value used may be one of many system-specific values. Reference with regard to this condition can also be made to FIG. 6 at 630.

Figure 7:
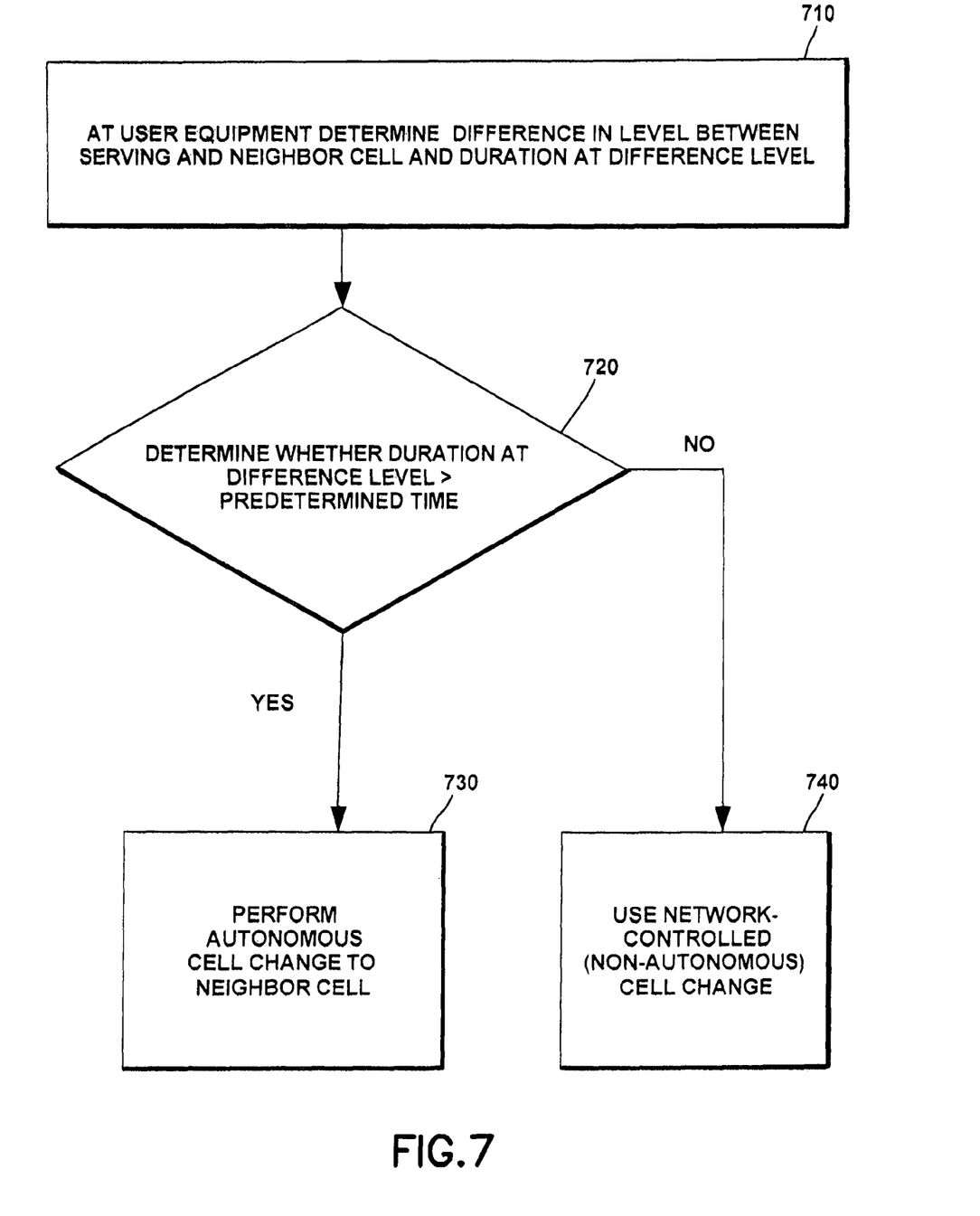
FIG. 7 is a flowchart depicting a decision whether to allow autonomous cell change base on a difference between characteristics of serving cell connection and a potential connection with a neighbor cell, all in accordance with the invention.

FIG. 7 is a flowchart depicting a method operating in accordance with this exemplary embodiment. User equipment 110 at step 710 determines a difference in level associated with a connection parameter between a serving and a neighbor cell and the time duration at the difference level. Assuming the difference is greater than a predetermined threshold; at 720 the user equipment 110 determines whether the duration at the difference level is greater than a pre-determined time. If it is greater than a pre-determined time at 730 the user equipment 110 performs an autonomous cell change to a neighbor cell. If it is less than the pre-determined time, the user equipment at 740 uses network-controlled (non-autonomous cell change). In the alternative, the user equipment can wait until threshold time condition for performing autonomous cell change is satisfied.

D. Another condition relates to a HO command delay being so long that the serving cell power or quality (or other measurement quantity or quantities) becomes less than some threshold limit (for some specified length of time). Alternatively, the decisions to perform autonomous cell change can be made when the delay in receiving the HO command exceeds a pre-determined time limit as shown at 620 in FIG. 6.

Figure 8:
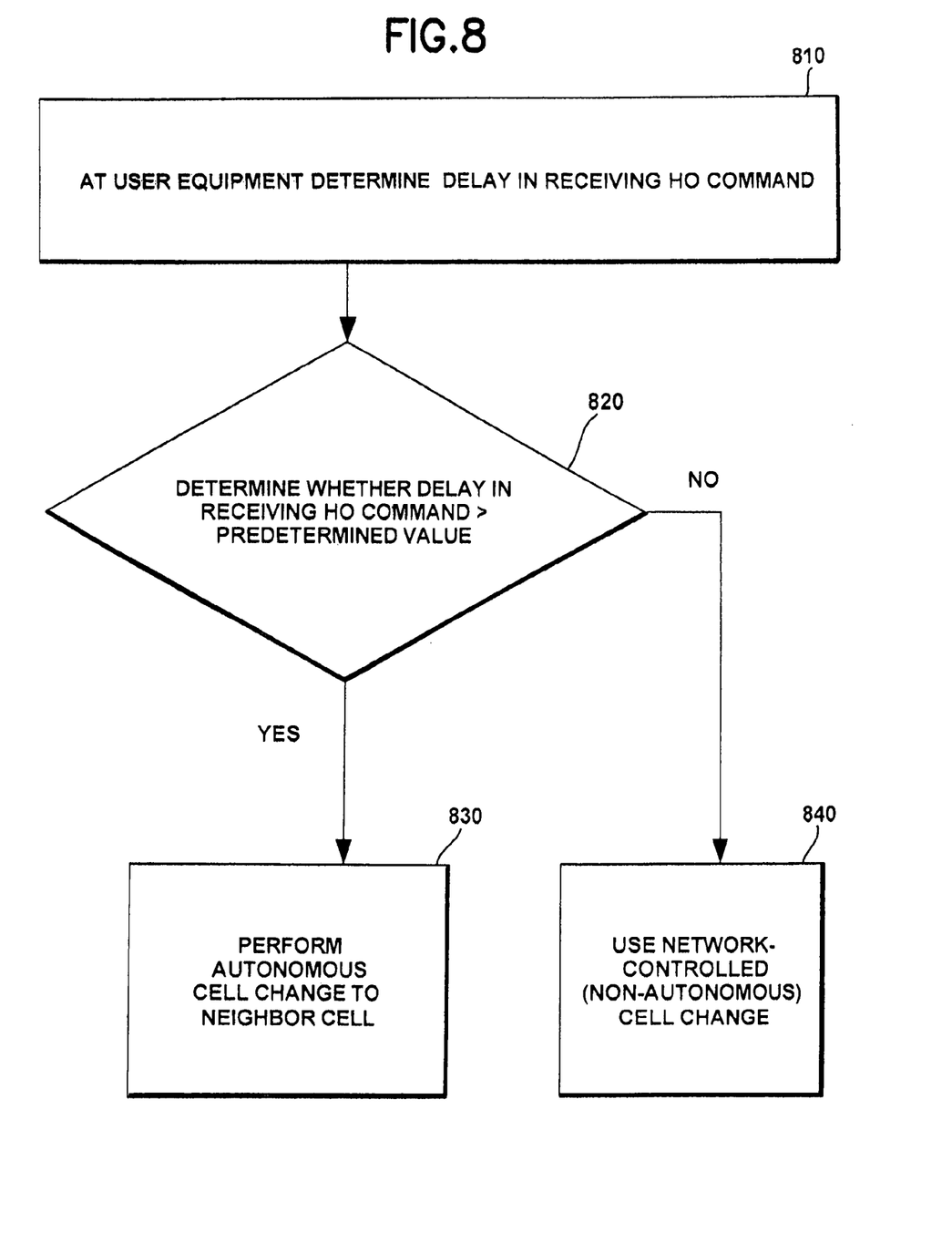
FIG. 8 is flowchart depicting a decision whether to allow autonomous cell change based on the delay in receiving an HO command, all in accordance with the invention.

A method to handle this situation is shown in FIG. 8. User equipment 110 at 810 determines a delay in receiving an HO command. Then, at 820, the user equipment determines whether the delay in receiving the HO command is greater than a predetermined value. If the delay is greater than the pre-determined value, the UE 110 performs autonomous cell change. If it is less, the user equipment 110 uses network-controlled (non-autonomous) cell change at 840. In the alternative, the user equipment waits to perform the cell change until the delay in receiving the HO command exceeds the predetermined value.

Figure 4:
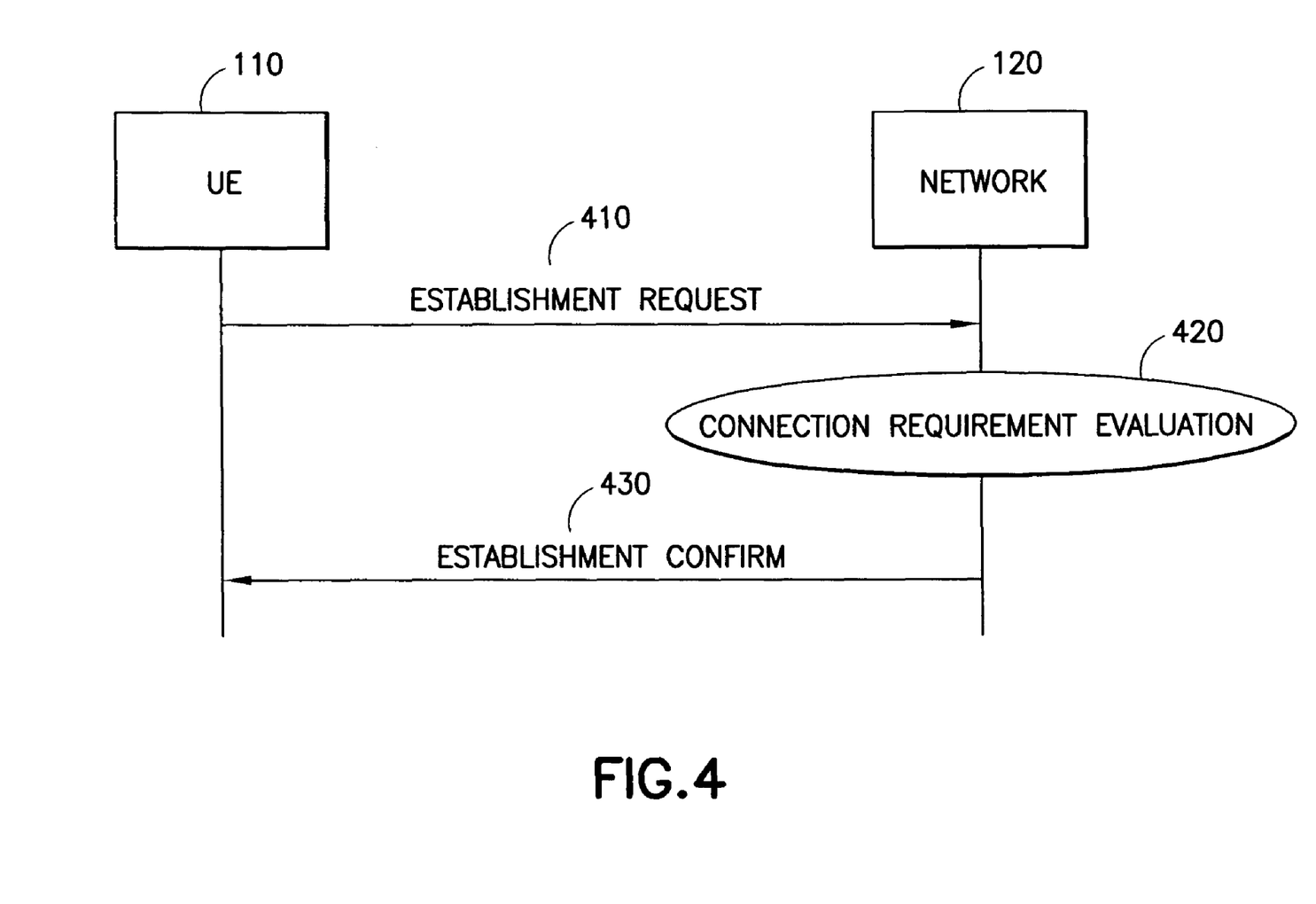
FIG. 4 is a block diagram depicting an establishment request being issued by a UE to the Network.

E. Another possible condition may be related to a specific network setting, as illustrated in FIG. 4. In this case the UE 110 sends an establishment request 410 to the network 120 requesting resources for a certain connection type. The network evaluates the requested connection type and requirements (e.g. delay, jitter) at 420 and sends an establishment confirm message 430 to the UE 110 including, among other information, whether the UE 110 shall use one of network-controlled HO for mobility or autonomous cell change for mobility.

Figure 5:
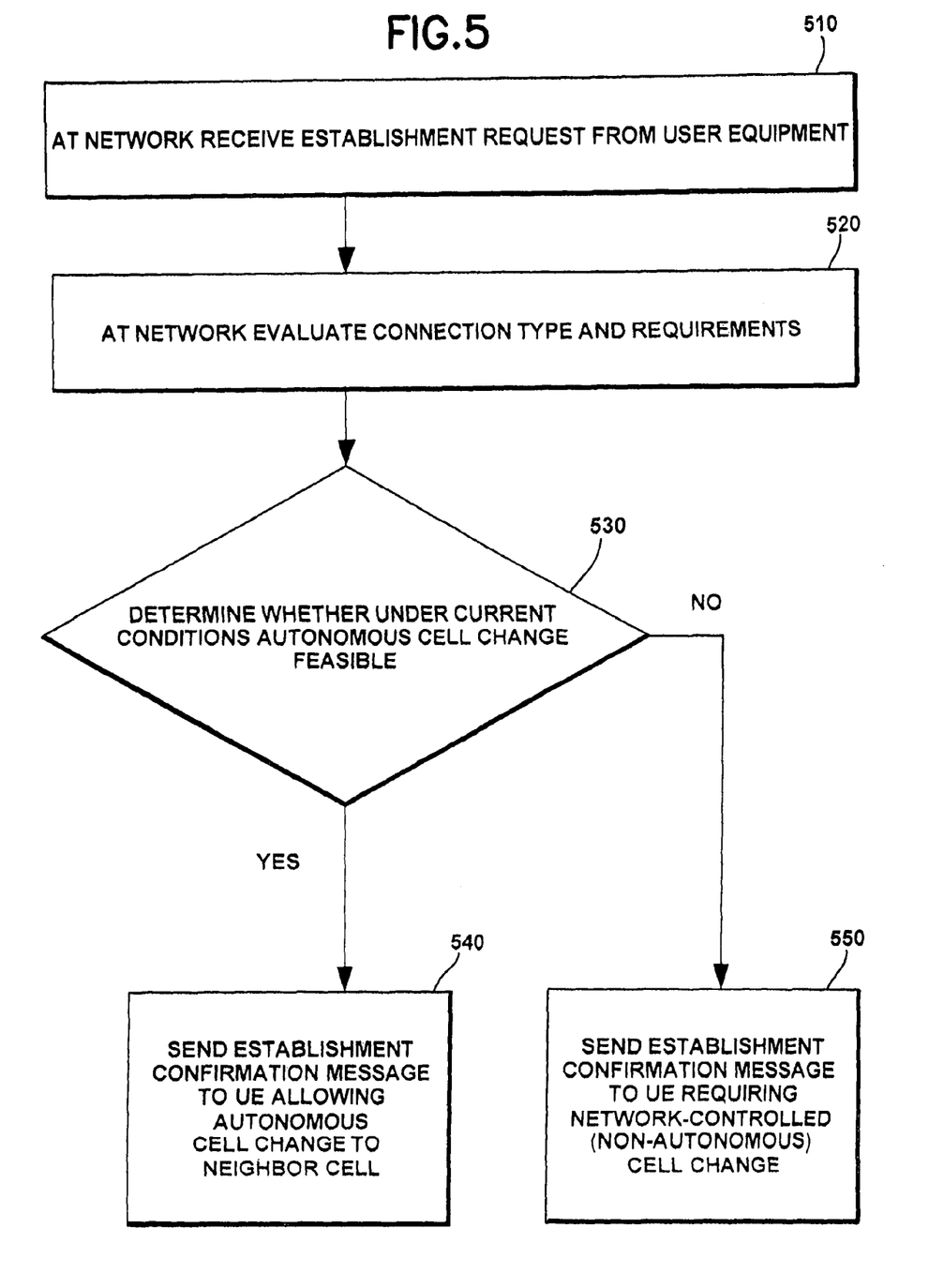
FIG. 5 is a flowchart depicting whether to allow autonomous cell change based on an establishment request, all in accordance with the invention.

An exemplary method for performing this aspect of the invention is depicted in FIG. 5. In step 510, the network receives an establishment request from user equipment. Then, at step 520, the user equipment evaluates connection type and requirements. Next, at 530, the network determines whether under current conditions autonomous cell change is feasible. If so, at 540 the network sends an establishment confirmation message to UE allowing autonomous cell change to a neighbour cell. If not, at 550 the network sends establishment confirmation message to UE requiring network-controlled (non-autonomous) cell change.

F. Another possible condition may be related to a connection type (depending on parameters such as, but not limited to, delay and/or jitter), is generally depicted illustrated in FIG. 9, where synchronization state is provided as one example of a parameter.

G. Another possible condition may be related to a history of past services that the UE 10 has used.

Figure 9:
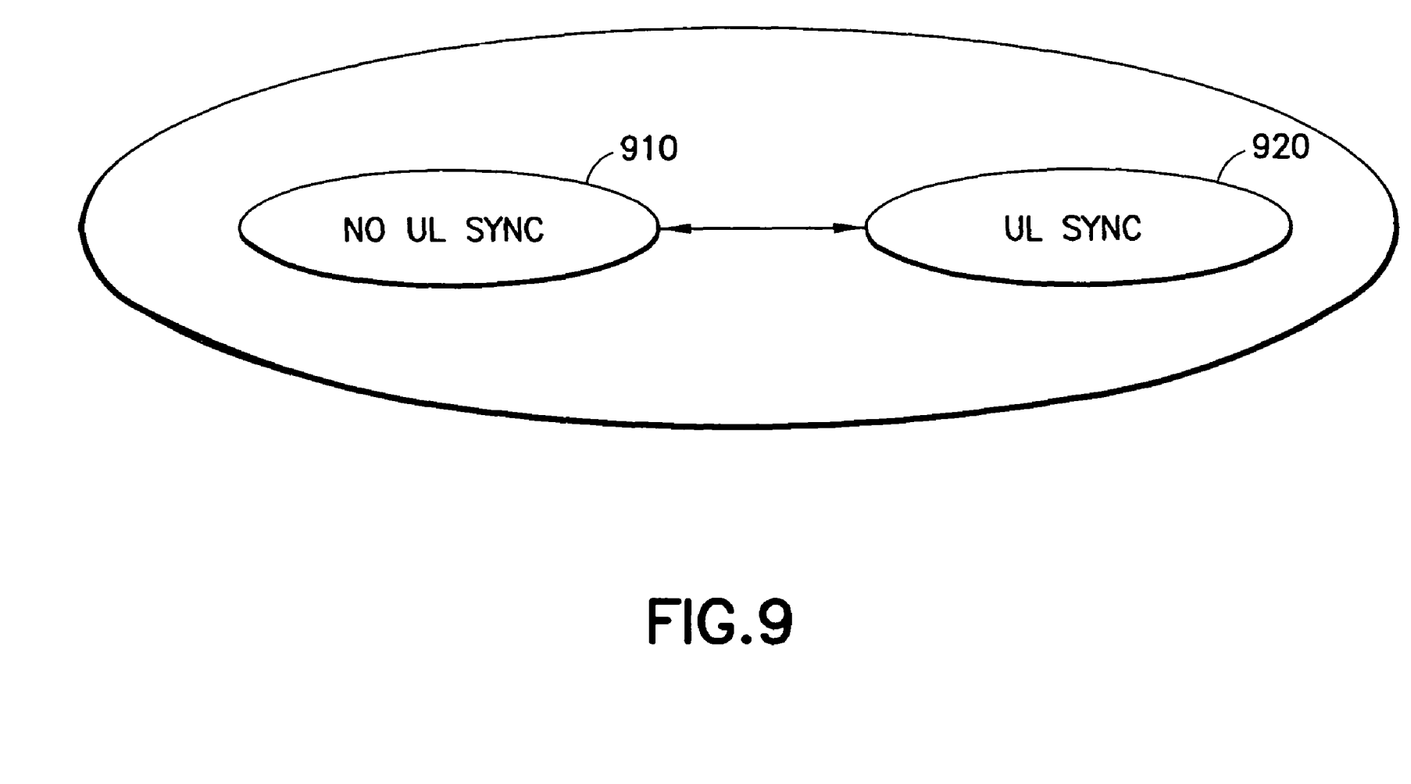
FIG. 9 is a diagram depicting uplink synchronization status for UE.

H. Another possible condition relates to mobility behavior based on UL synchronization status, as depicted in FIG. 9. In this case the UE 110, when in the Active state, makes a determination as to whether the UL is synchronized or unsynchronized. If in the UL synchronized state, only HO is permitted and no Autonomous reselection is permitted, while if not in the UL synchronized state then UE 10 autonomous cell reselection or HO is permitted.

Figure 10:
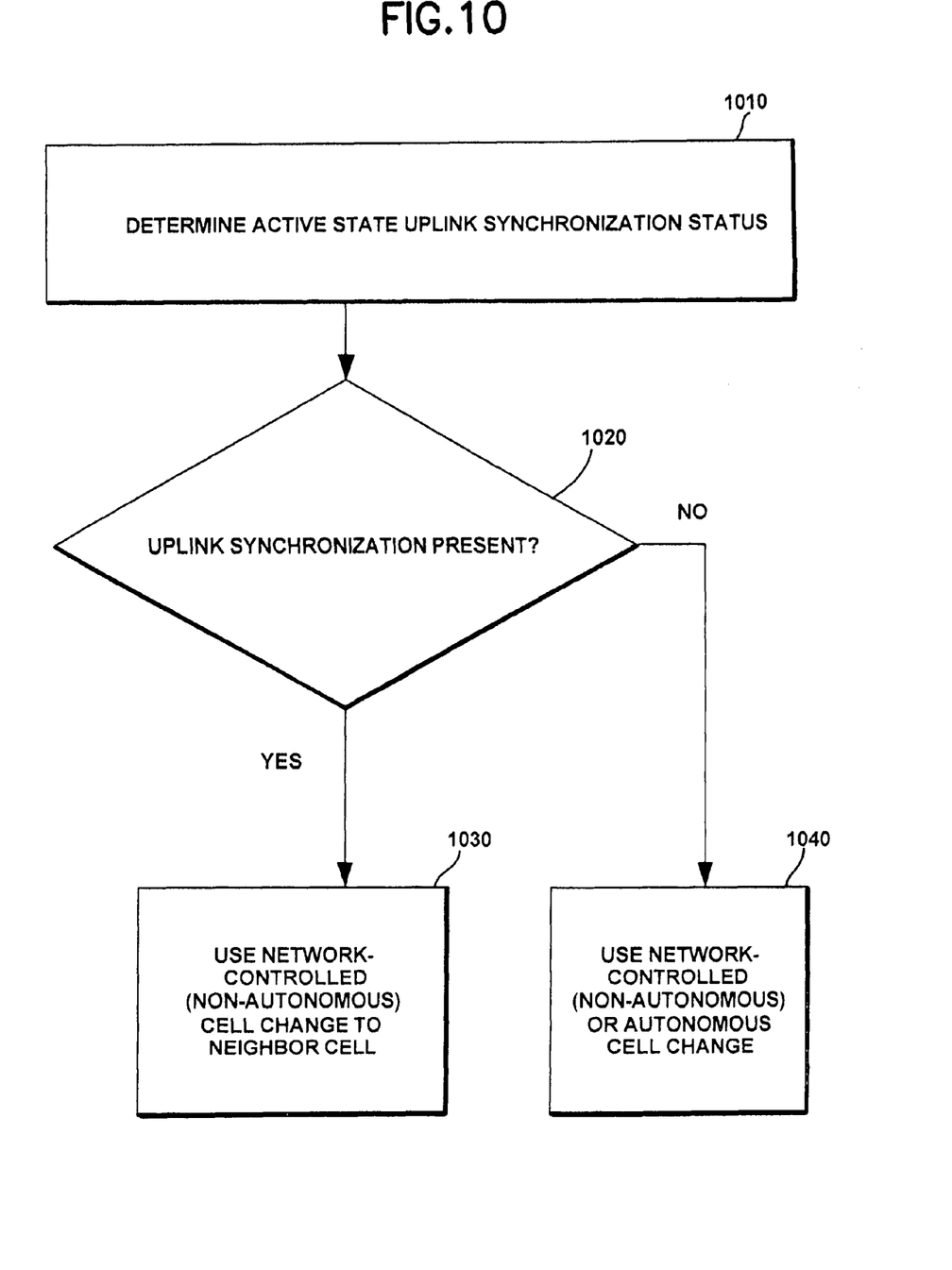
FIG. 10 is a flow chart depicting a decision whether to allow autonomous cell change based on uplink synchronization status, all in accordance with the invention.

A method for performing this aspect of the invention is depicted in FIG. 10. At step 1010, the UE 110 determines active state uplink synchronization status. Then, at 1020, the UE 110 determines whether uplink synchronization is present. If not, at step 1040, the UE 110 can use network-controlled or autonomous cell change. If uplink synchronization is present, at step 1030 the UE 110 uses network-controlled (non-autonomous) cell change to a neighbor cell.

The trigger for performing the mobile assisted cell change may be a combination of any of the conditions listed above and/or other conditions. As a non-limiting example, the autonomous UE 110 cell change trigger may be based on the DRX time being longer than the specified time, and the level of a measured quantity is found to be below some threshold.

The UE 110 autonomous cell change procedure may be protected against an occurrence of a ping-pong cell change effect by the use of different protection mechanisms that include, but need not be limited to, one or more of: a timer whereby the UE 110 may not reselect back to the former cell for some certain amount of time; an additional offset that is applied to the former cell, thereby biasing the selection against the former cell; and/or the use of a counter, where the UE 110 offset/timer depends on a counted number of cell changes.

Figure 2:
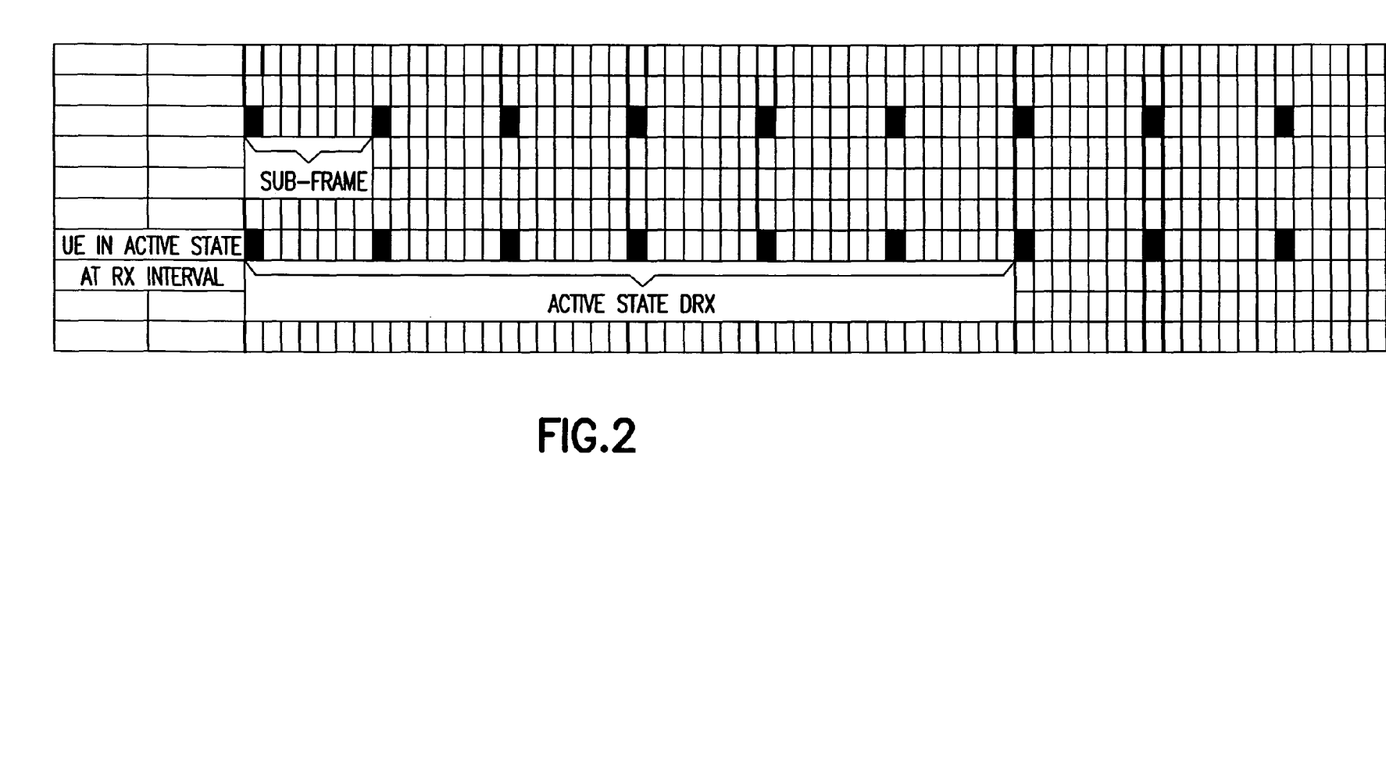
FIG. 2 is a chart depicting a situation where the DRX time period is greater than a pre-determined time.

As non-limiting implementation examples:

1) If the DRX period is greater than X (X being defined in a specification) the UE 110 may/shall perform autonomous mobility through a cell change (see FIGS. 2, 3).

2) During a connection setup the network informs, based on the nature/requirement of the connection such as delay, jitter and possible other settings, that the UE 110 should use autonomous mobility through a cell change (see FIGS. 4, 5).

3) The UE 110 knows from network settings (or through signaling, such as RRC signaling) that autonomous mobility through cell change shall be used if the serving cell quality level falls below a defined threshold. Another input parameter to the UE 110 may be a currently used DRX cycle length (see FIGS. 6-8).

Figure 11:
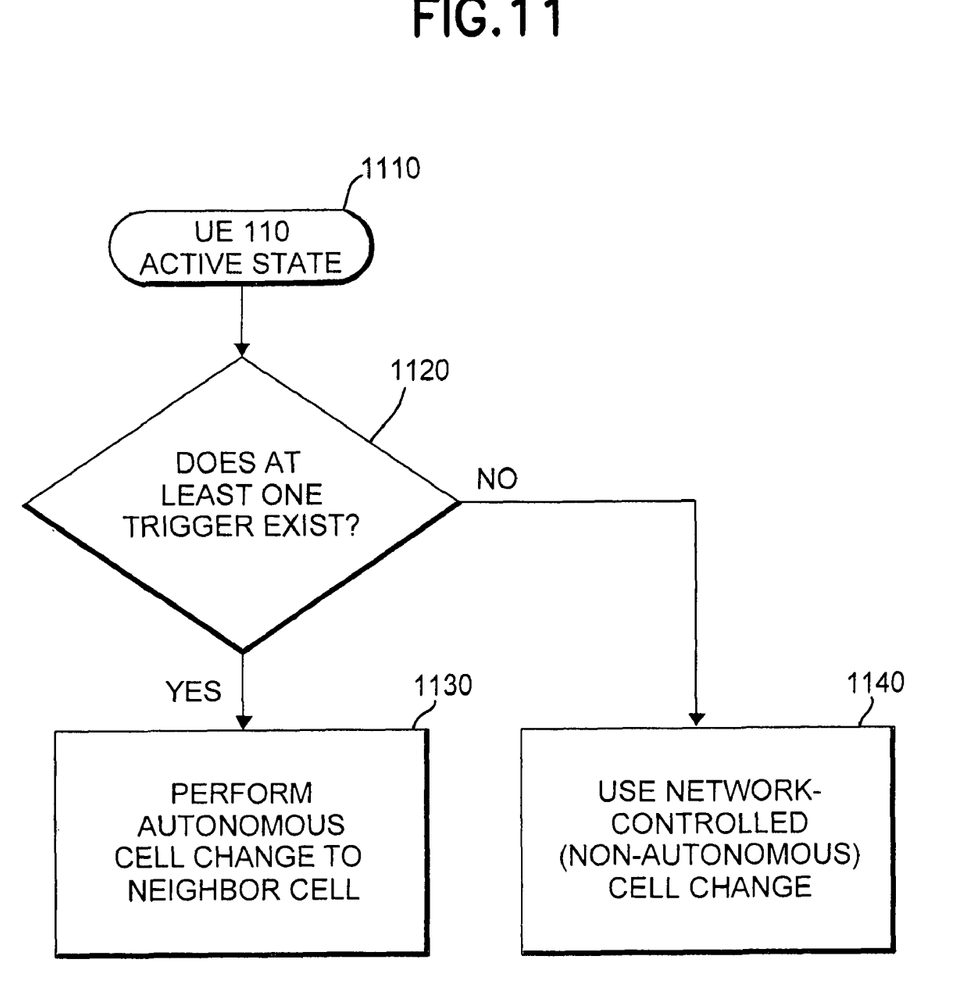
FIG. 11 is a flow chart depicting in general terms methods in accordance with the invention.

FIG. 11 is a logic flow diagram that illustrates in summary terms the operation of the UE of FIG. 1 in accordance with exemplary embodiments of this invention. At Block 1110 the UE 110 enters the Active state. At Block 1120 the UE 110 evaluates one or more of the conditions discussed above to determine if at least one trigger condition is satisfied to enable Autonomous HO to a neighbor cell. If at least one trigger is generated, the UE 110 makes an Autonomous cell change (Block 1130), otherwise the UE 110 uses a network-controlled cell change trigger (Block 1140).

As should be appreciated, a number of advantages can be realized by the use of the exemplary embodiments of this invention. For example, the use of the exemplary embodiments of this invention provide making Active state mobility in a 3.9G system more flexible such that it is not controlled only by network-controlled HO. Further by example, UE failures in connection with the delays introduced by having long DRX (measurement and reporting cycles) are minimized. The occurrence of certain severe failures, such as loss of service, can be reduced. Further by example, the use of the exemplary embodiments of this invention reduces interference caused by the UE 110 due to a delayed HO procedure. Further by example, the use of the exemplary embodiments of this invention can aid in reducing the signaling load between the UE 110 and the Node B 120. Further by example, the use of the exemplary embodiments of this invention reduces complexity in the network related to controlling Active-state mobility due to the reduced amount of directly controlled UEs. However, the network is still enabled to directly control certain UEs, such as those engaged in high in data transmission activity.

The exemplary embodiments of this invention thus provide a method, a computer program product, and apparatus providing a permission-based UE 110 execution of an autonomous cell change in the Active state in response to a trigger being generated due to the fulfillment of at least one criterion. In an exemplary, but not limiting embodiment, the UE 110 operates in a 3.9G (LTE or E-UTRAN) network environment. The exemplary embodiments of this invention thus also provide a method, a computer program product, and apparatus enabling a network node to grant permission to the UE 110 to execute an autonomous cell change in the Active state in response to a trigger being generated due to the fulfillment of at least one criterion. The trigger may be generated in response to one or more conditions being satisfied. The conditions may comprise, as non-limiting examples, one or more of the DRX period being longer than a specified time, the quality level of the serving cell decreasing below a certain pre-defined level, a basic power or quality level offset existing between the serving cell and a neighbor cell (for some specified length of time), a HO command delay being so long that the serving cell power or quality (or other measurement quantity or quantities) becomes less than some threshold limit (for some specified length of time), a specific network setting, a connection type, a history of past services that the UE 110 has used, and/or mobility behavior based on the UL synchronization status.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

For example, while in certain exemplary embodiments above mention has been made of time units of seconds or minutes it should be appreciated that other temporally-related units could be employed, such as system frame number as one non-limiting example.

Furthermore, some of the features of the various non-limiting embodiments of this invention may be used to advantage without the corresponding use of other features. As such, the foregoing description should be considered as merely illustrative of the principles, teachings and exemplary embodiments of this invention, and not in limitation thereof.

We claim:

1. A method comprising:
   detecting whether user equipment operative in a wireless communications network is in an active state;
   determining whether at least one trigger condition is satisfied;
   in response detecting that the user equipment is in the active state and determining that the at least one trigger condition is satisfied, allowing the user equipment to perform an autonomous cell change of the user equipment from a serving cell to a neighbor cell; and
   in response to detecting that the user equipment is in the active state and determining that each of the at least one trigger condition is not satisfied, performing a network-controlled cell change of the user equipment from the serving cell to a network determined neighbor cell.

2. The method of claim 1 wherein the wireless communications network is a 3.9G network.

3. The method of claim 1 wherein the wireless communications network is an E-UTRAN network.

4. The method of claim 1 wherein the at least one trigger condition comprises a discontinuous reception period being longer than a specified time.

5. The method of claim 4 wherein the specified time is set by the network.

6. The method of claim 1 wherein the at least one trigger condition corresponds to a quality level of the serving cell falling below a certain pre-defined level.

7. The method of claim 1 wherein the at least one trigger condition corresponds to an offset between the serving cell and the neighbor cell of a connection characteristic persisting for a predetermined period of time.

8. The method of claim 7 wherein the connection characteristic corresponds to power.

9. The method of claim 7 wherein the connection characteristic corresponds to a signal quality measure.

10. The method of claim 1 wherein the at least one trigger condition corresponds to a handover command being delayed for a period of time during which a characteristic of the serving cell becomes less than a threshold limit.

11. The method of claim 1 wherein the at least one trigger condition further comprises a characteristic of the serving cell persisting at less than a threshold limit for a predetermined period of time.

12. The method of claim 1 wherein the at least one trigger condition concerns requirements for a connection type.

13. The method of claim 1 wherein the at least one trigger condition is related to a history of past services that the user equipment has used.

14. An apparatus comprising at least one processor; and at least one memory including computer program code, the at least one memory and including computer program code configured to, with the at least one processor, cause the apparatus to perform at least the following:
   to detect whether a user equipment is in active state;
   to determine whether at least one trigger condition is satisfied;
   in response to detecting that the user equipment is in the active state and determining that the at lease one trigger condition is satisfied, to allow the user equipment to perform an autonomous cell change of the user equipment from a serving cell to a neighbor cell; and
   in response to detecting that the user equipment is in the active state and determining that each of the at least one trigger condition is not satisfied, performing a network-controlled cell change of the user equipment from the serving cell to a network determined neighbor cell.

15. The apparatus of claim 14, where the apparatus is embodied in at least one integrated circuit.

16. The apparatus of claim 14, wherein the at least one trigger condition comprises a discontinuous reception period being longer than a specified time.

17. The apparatus of claim 14, wherein the at least one trigger condition corresponds to a quality level of the serving cell falling below a certain pre-defined level.

18. The apparatus of claim 14, wherein the at least one trigger condition corresponds to an offset between the serving cell and the neighbor cell of a connection characteristic persisting for a predetermined period of time.

19. The apparatus of claim 18, wherein the connection characteristic corresponds to power.

20. The apparatus of claim 18, wherein the connection characteristic corresponds to a signal quality measure.

21. The apparatus of claim 14, wherein the at least one trigger condition corresponds to a handover command being delayed for a period of time during which a characteristic of the serving cell becomes less than a threshold limit.

22. The apparatus of claim 14, wherein the at least one trigger condition further comprises a characteristic of the serving cell persisting at less than a threshold limit for a predetermined period of time.

23. The apparatus of claim 14, wherein the at least one trigger condition concerns requirements for a connection type.

24. The apparatus of claim 14, wherein the at least one trigger condition is related to a history of past services that the user equipment has used.

25. A computer readable medium tangibly encoded with, a computer program executable by digital processing apparatus to perform actions comprising:
   detecting whether user equipment operative in a wireless communications network is in an active state;
   determining whether at least one trigger condition is satisfied;
   in response detecting that the user equipment is in the active state and determining that the at least one trigger condition is satisfied, allowing the user equipment to perform an autonomous cell change of the user equipment from a serving cell to a neighbor cell; and in response to detecting that the user equipment is in the active state and determining that each of the at least one trigger condition is not satisfied, performing a network-controlled cell change of the user equipment from the serving cell to a network determined neighbor cell.

26. The computer readable medium of claim 25 wherein the digital processing apparatus is embodied in the user equipment.

27. An apparatus comprising at least one processor; and at least one memory including computer program code, the at least one memory and the computer program code configured to, with the at least one processor, cause the apparatus to perform at least the following:
   detecting whether a user equipment is in an active state;
   determining whether at least one trigger condition is satisfied for the user equipment;
   communicating to the user equipment that is it authorized to perform an autonomous cell change in response to detecting that: the user equipment is in the active state and determining that the least one trigger condition is satisfied; and
   in response to detecting that the user equipment is in the active state and determining that each of the at least one trigger condition is not satisfied, performing a network-controlled cell change of the user equipment from the serving cell to a network determined neighbor cell.

28. The apparatus of claim 27, where the at least one trigger condition comprises a discontinuous reception period being longer than a specified time.

29. An apparatus comprising:
   means for detecting whether a user equipment operative in a wireless communications network is in an active state:
   means for determining whether at least one trigger condition is satisfied;
   means for allowing the user equipment to perform an autonomous cell change of the user equipment from a serving cell to a neighbor cell in response to detecting that the user equipment is in the active state and determining that the at least one trigger condition is satisfied; and
   means for performing a network-controlled cell change of the user equipment from the serving cell to a network determined neighbor cell in response to detecting that the user equipment is in the active state and determining that each of the at least one trigger condition is not satisfied.

* * * * *